United States Patent
Matsumoto et al.

(10) Patent No.: US 7,436,172 B2
(45) Date of Patent: Oct. 14, 2008

(54) ANGULAR SPEED DETECTING DEVICE USING DUAL ANGULAR POSITION SIGNALS TO REDUCE NOISE

(75) Inventors: Koichiro Matsumoto, Kariya (JP); Tatsuya Kitanaka, Nagoya (JP)

(73) Assignee: Denso Corporation, Kariya, Aichi-Pref (JP)

( * ) Notice: Subject to any disclaimer, the term of this patent is extended or adjusted under 35 U.S.C. 154(b) by 165 days.

(21) Appl. No.: 11/108,796

(22) Filed: Apr. 19, 2005

(65) Prior Publication Data

US 2005/0242802 A1    Nov. 3, 2005

(30) Foreign Application Priority Data

Apr. 30, 2004    (JP)    .............................. 2004-135252

(51) Int. Cl.
*G01P 3/54* (2006.01)
*G01R 33/07* (2006.01)
*G01R 33/09* (2006.01)

(52) U.S. Cl. ............... 324/174; 324/207.2; 324/207.21; 702/145

(58) Field of Classification Search ............ 324/207.25, 324/174, 207.2, 207.21, 173, 179, 166; 702/145–149, 702/96

See application file for complete search history.

(56) References Cited

U.S. PATENT DOCUMENTS

2003/0177649 A1* 9/2003 Ito et al. ..................... 33/1 PT

FOREIGN PATENT DOCUMENTS

| JP | 60211366 A | * 10/1985 |
| JP | 2002-340511 |   11/2002 |
| JP | 2002340512 A | * 11/2002 |

* cited by examiner

*Primary Examiner*—Patrick Assouad
*Assistant Examiner*—David M. Schindler
(74) *Attorney, Agent, or Firm*—Nixon & Vanderhye PC (57) ABSTRACT

An angular speed detecting device is composed of a magnetic sensor unit connected to a rotating object and including a permanent magnet and a pair of magnetic sensor elements to generate a pair of signals and an electric computing unit that calculates an angular speed from the signals. The electric computing unit calculates the angular speed by the following steps: forming sine and cosine functions of an angle $\theta'$ from the signals; forming a saw-tooth curve of the angle $\theta'$; forming a table showing plus or minus sign of the signals and the saw-tooth curve of the angle $\theta'$ at a plurality of rotation angles of the rotating object; forming a pair of curves of output angles $\theta_1$ and $\theta_2$ in terms of 360-degree angular range by distinguishing rotation position of the rotating object from a combination of the plus, or minus sign of the signals and the saw-tooth curve of the angle $\theta'$; and selectively using curves of the output angles $\theta_1$ and $\theta_2$ to calculate the angular speed of a rotating object.

26 Claims, 10 Drawing Sheets

| ROTATION ANGLE | Va | Vb | $\theta'$ | OFFSET ANGLE | $\theta_1$ |
|---|---|---|---|---|---|
| 0 | 0 | + | 0 | 0 | 0 |
|   | N | + | + | 0 | $\theta'$ |
| 45 | + | + | + | 0 | 45 |
|   | + | N | + | 0 | $\theta'$ |
| 90 | + | 0 | 90 | 0 | 90 |
|   | + | N | − | 180 | $\theta'+180$ |
| 135 | + | − | − | 180 | 135 |
|   | N | − | − | 180 | $\theta'+180$ |
| 180 | 0 | − | 0 | 180 | 180 |
|   | N | − | + | 180 | $\theta'+180$ |
| 225 | − | − | + | 180 | 225 |
|   | − | N | + | 180 | $\theta'+180$ |
| 270 | − | 0 | 90 | 180 | 270 |
|   | − | N | − | 360 | $\theta'+360$ |
| 315 | − | + | − | 360 | 315 |
|   | N | + | − | 360 | $\theta'+360$ |
| 360 | 0 | + | 0 | 360 | 360(0) |

FIG. 5

| ROTATION ANGLE | Va | Vb | θ' | OFFSET ANGLE | θ2 |
|---|---|---|---|---|---|
| 0 | 0 | + | 0 | 180 | 180 |
|   | N | + | + | 180 | θ'+180 |
| 45 | + | + | + | 180 | 225 |
|   | + | N | + | 180 | θ'+180 |
| 90 | + | 0 | 90 | 180 | 270 |
|   | + | N | − | 360 | θ'+360 |
| 135 | + | − | − | 360 | 315 |
|   | N | − | − | 360 | θ'+360 |
| 180 | 0 | − | 0 | 0 | 0 |
|   | N | − | + | 0 | θ' |
| 225 | − | − | + | 0 | 45 |
|   | − | N | + | 0 | θ' |
| 270 | − | 0 | 90 | 0 | 90 |
|   | − | N | − | 180 | θ'+180 |
| 315 | − | + | − | 180 | 135 |
|   | N | + | − | 180 | θ'+180 |
| 360 | 0 | + | 0 | 180 | 180 |

| ROTATION ANGLE | Va+Vb | Va−Vb | θ' | θ1 |
|---|---|---|---|---|
| 0 | + | − | 0 | 0 |
|  | + | N | + | θ' |
| 90 | + | + | 0 | 90 |
|  | N | + | − | θ'+180 |
| 180 | − | + | 0 | 180 |
|  | − | N | + | θ'+180 |
| 270 | − | − | 0 | 270 |
|  | N | − | − | θ'+360 |
| 360 | + | − | 0 | 0 |

FIG. 8

| ROTATION ANGLE | Va+Vb | Va−Vb | θ' | θ2 |
|---|---|---|---|---|
| 0 | + | − | 0 | 180 |
|  | + | N | + | θ'+180 |
| 90 | + | + | 0 | 270 |
|  | N | + | − | θ'+360 |
| 180 | − | + | 0 | 0 |
|  | − | N | + | θ' |
| 270 | − | − | 0 | 90 |
|  | N | − | − | θ'+180 |
| 360 | + | − | 0 | 180 |

| ROTATION ANGLE | Va+Vb | Va−Vb | θ0' | θ0 |
|---|---|---|---|---|
| 0 | + | − | 0 | 0 |
|  | + | N | + | θ0' |
| 90 | + | + | 0 | 90 |
|  | N | + | − | θ0'+180 |
| 180 | − | + | 0 | 180 |
|  | − | N | + | θ0'+180 |
| 270 | − | − | 0 | 270 |
|  | N | − | − | θ0'+360 |
| 360 | + | − | 0 | 0 |

FIG. 14

| ROTATION ANGLE | Va+Vc | Va−Vc | θ1' | θ1 |
|---|---|---|---|---|
| 0 | − | + | 0 | 270 |
|  | N | + | − | θ'+360 |
| 90 | + | + | 0 | 0 |
|  | + | N | + | θ1' |
| 180 | + | − | 0 | 90 |
|  | N | − | − | θ1'+180 |
| 270 | − | − | 0 | 180 |
|  | − | N | + | θ1'+180 |
| 360 | − | + | 0 | 270 |

FIG. 15

| ROTATION ANGLE | Va | Vb | θ0' | θ1' |
|---|---|---|---|---|
| 0 | 0 | + | 0 | −90 |
|  | + | + | + | θ'−90 |
| 90 | + | 0 | 0 | 0 |
|  | + | − | − | θ'+90 |
| 180 | 0 | − | 0 | 90 |
|  | − | − | + | θ'−90 |
| 270 | − | 0 | 0 | 0 |
|  | − | + | − | θ'+90 |
| 360 | 0 | + | 0 | −90 |

| ROTATION ANGLE | Va | Vb | θ |
|---|---|---|---|
| 0 | 0 | + | 0 |
|  | + | + | θ' |
| 90 | + | 0 | 90 |
|  | + | − | θ'+180 |
| 180 | 0 | − | 180 |
|  | − | − | θ'+180 |
| 270 | − | 0 | 270 |
|  | − | + | θ'+360 |
| 360 | 0 | + | 0 |

US 7,436,172 B2

ANGULAR SPEED DETECTING DEVICE USING DUAL ANGULAR POSITION SIGNALS TO REDUCE NOISE

CROSS REFERENCE TO RELATED APPLICATION

The present application is based on and claims priority from Japanese Patent Application 2004-135252, filed Apr. 30, 2004, the contents of which are incorporated herein by reference.

BACKGROUND OF THE INVENTION

1. Field of the Invention

The present invention relates to an angular speed detecting device that detects the rotation speed of a rotating object.

2. Description of the Related Art

Figure 16:
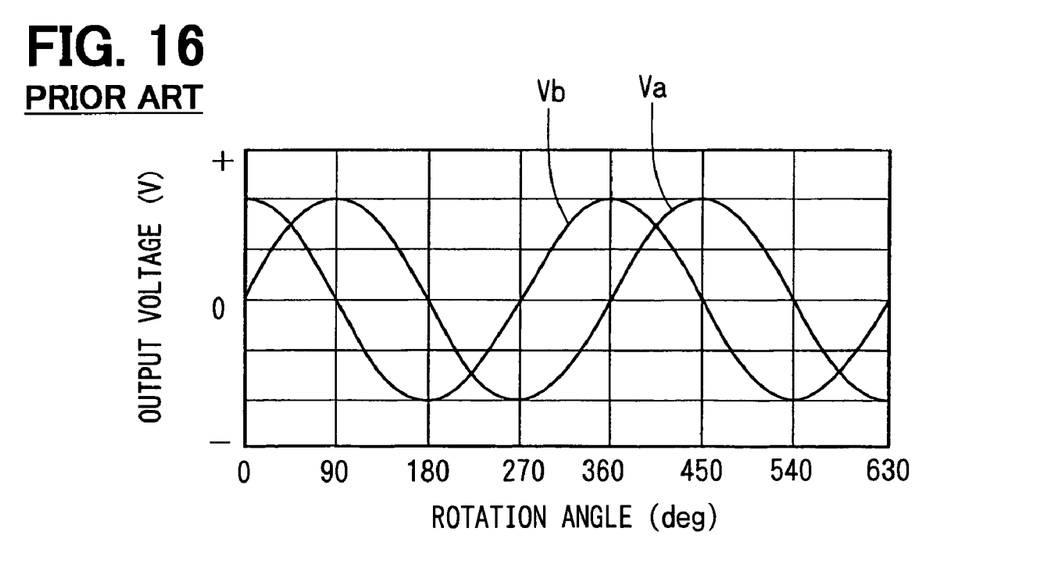
FIG. 16 is a graph showing a relationship between the rotation angle of a rotating object and the output voltages of a magnetic sensor unit of a prior art angular speed detecting device.
Figure 17:
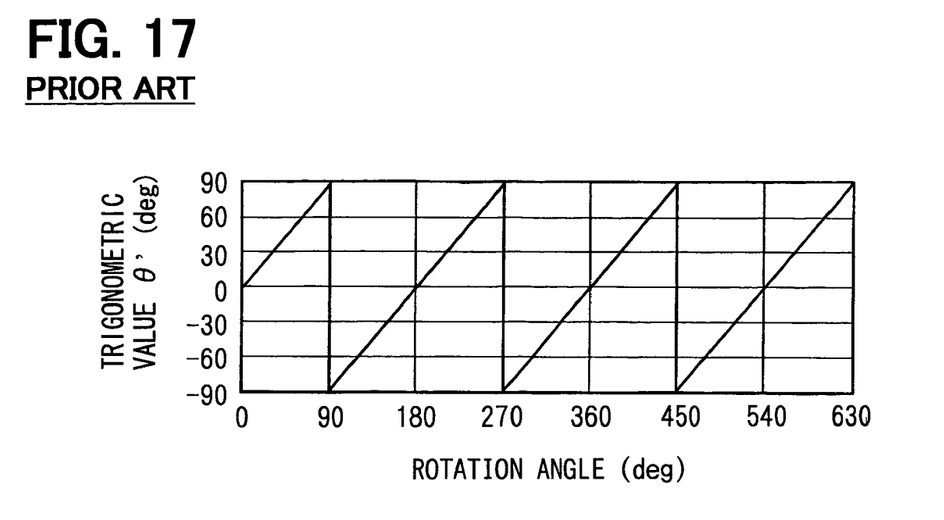
FIG. 17 is a graph showing a relationship between the rotation angle of a rotating object and trigonometric values of the angular speed detecting device of the prior art angular speed detecting device.
Figure 18:
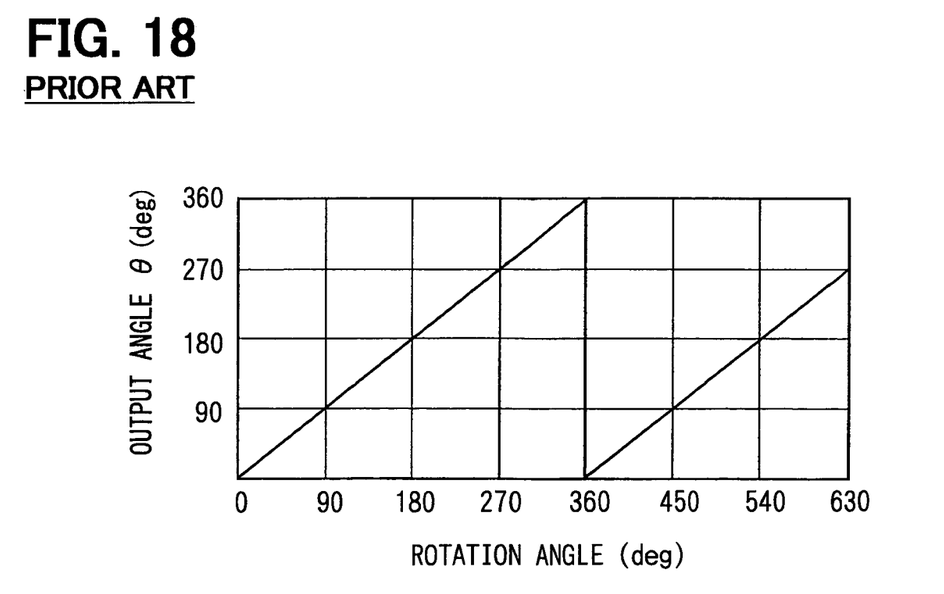
FIG. 18 is a graph showing a relationship between the rotation angle of a rotating object and output angles of the prior art angular speed detecting device.
Figure 19:
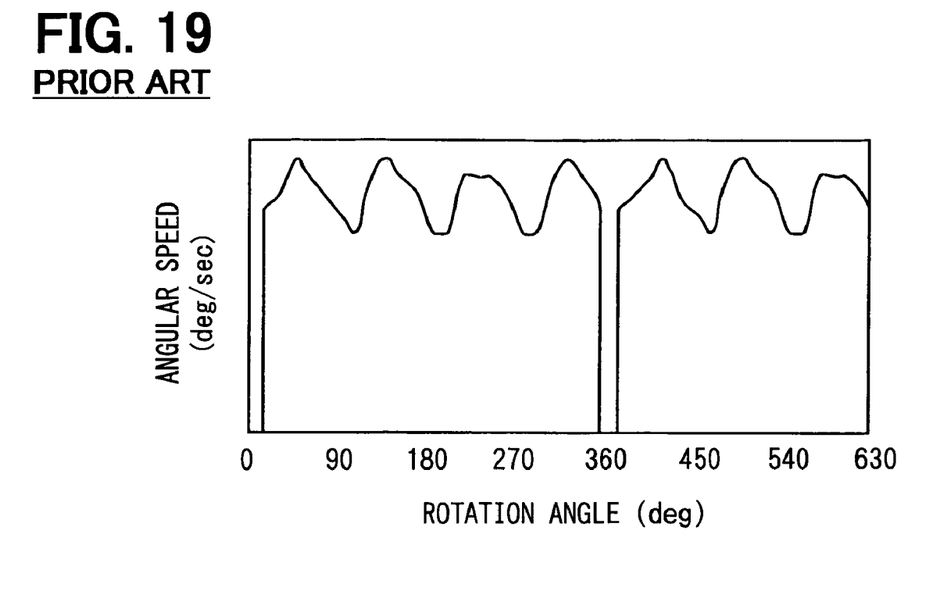
FIG. 19 is a graph showing a relationship between the rotation angle of a rotating object and the angular speed provided by the prior art angular speed detecting device.
Figure 20:
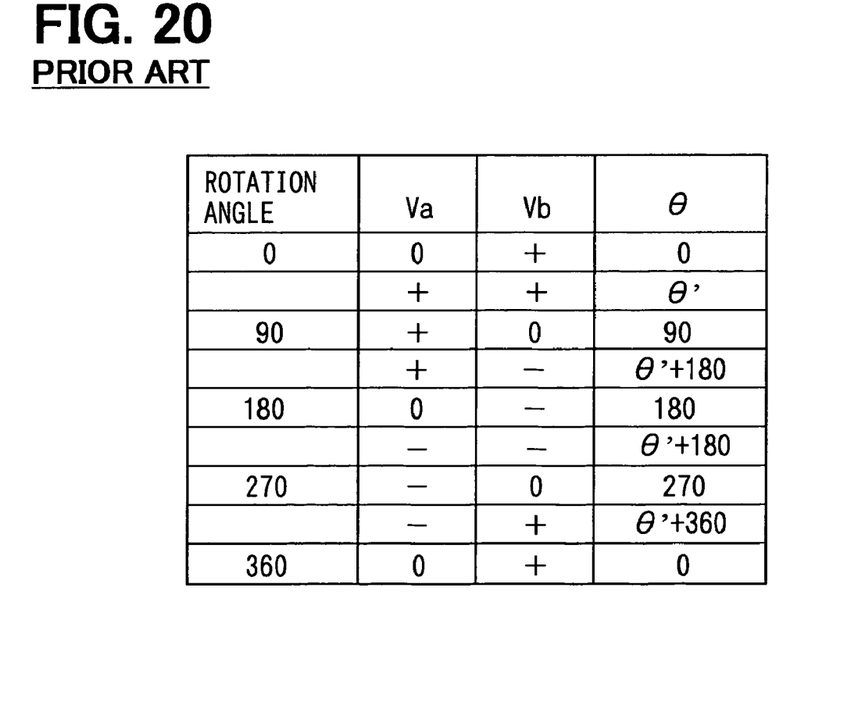
FIG. 20 is a table showing a relationship between rotation angle ranges and combinations of positive and negative signs of output signals of a magnetic sensor unit of the prior art angular speed detecting device.

A magnetic sensor unit that is composed of a pair of magnetic sensing elements and a magnetic field setting member is well-known for a device to detect the rotation angle of a rotating object, as disclosed in JP-A-2002-340511. In such a device, a pair of sensor elements provides signals Va and Vb, as shown in FIG. 16. Then, a saw-tooth-wave curve of trigonometric values θ' that correspond to the arctangent of the signals Va and Vb, is provided as shown in FIG. 17. Then, plural rotation angle ranges of the rotating object between 0 degree and 360 degrees can be known from combinations of the positive and negative signs of the output signals Va and Vb, as shown in FIG. 20. Therefore, the rotation angle of the rotating object in terms of 360 degrees can be known from the output angle θ, as shown in FIG. 18, so that the angular speed of the rotating object can be obtained by differentiating the output angle θ in theory. However, when one intends to obtain the angular speed of the rotating object from the rotation angle around 360 degrees from the output angle θ, he will have a difficulty because the output angle θ before or after 360 degrees changes too sharply to differentiate it, as shown in FIG. 19.

SUMMARY OF THE INVENTION

Therefore, it is an object of the invention to provide an improved angular speed detecting device that can accurately detect angular speed irrespective of the angular position.

According to a preferred feature of the invention, an angular speed detecting device for detecting an angular speed of a rotating object includes a magnetic field setting means, sinusoidal signal generating means for generating a pair of first sinusoidal signal Va and a second sinusoidal signal Vb and an angular speed calculating means. The angular speed calculating means calculates the angular speed by a processing program that is composed of the following steps: forming a pair of trigonometric functions of a trigonometric value θ' from the sinusoidal signals Va and Vb; forming a table showing plus or minus sign of the pair of the sinusoidal signals Va, Vb and the trigonometric values θ' at a plurality of rotation angles of the rotating object; distinguishing rotation position of the rotating object from combinations of the plus or minus sign of the first and second sinusoidal signals Va, Vb and the trigonometric values θ'; forming a pair of saw-tooth curves of output angles $\theta_1, \theta_2$ in terms of 360-degree angular range that are different in phase to each other by adding offset values to the trigonometric values θ' according to the rotation position that is distinguished above; and selectively using curves of the output angles $\theta_1$ and $\theta_2$ to calculate the angular speed of a rotating object.

In the angular speed detecting device as described above, one of the pair of trigonometric functions is formed from a sum of the sinusoidal signals Va and Vb; and the other of the pair of trigonometric functions is formed from a difference between the sinusoidal signals Va and Vb. Further, the plus or minus sign of the voltage signals Va and Vbs neglected where the sign changes one from the other when distinguishing rotation position of the rotating object from combinations of the plus or minus sign of the first and second sinusoidal signals Va, Vb and the trigonometric values θ'. The second means may be composed of a pair of Hall elements. In this case, the Hall elements are preferably disposed in the magnetic field inclined with respect to each other at an angle of 90 degrees. The second means may be composed of a pair of magnetic resistance (reluctance) elements instead of the Hall elements.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

PREFERRED EMBODIMENTS

The present invention will be described with reference to some preferred embodiments that are shown in the appended drawings.

An angular speed detecting device 10 according to the first embodiment of the invention to be used for detecting the angular speed of a rotating object 1, such as a crankshaft or a vehicle wheel, will be described with references to FIGS. 1-5, 16 and 17. The angular speed detecting device 10 includes a pair of permanent magnets 12 and 114, a pair of Hall elements 20 and 22 and an electronic control unit (hereinafter referred to as the ECU) 30.

The permanent magnets 12, 14 provide a generally even magnetic field or a constant magnetic flux density in the space between them. The pair of Hall elements 20, 22 have the same construction and are disposed in the space between the permanent magnets 12, 14 inclined with respect to each other at an angle a (e.g. 90 degrees) and to the magnetic field at half the angle α. Therefore, when the rotating object 1 rotates and the Hall elements are electrically powered, the Hall element 20 generates a sinusoidal voltage signal Va and the Hall element 22 generates a sinusoidal voltage signal Vb, as shown in FIG. 16. The two sinusoidal voltage signals Va, Vb are different in phase from each other by 90 degrees and are defined by the following expressions.

$$Va = kBI \cdot \sin \theta' \quad (1)$$

$$Vb = kBI \cdot \sin(\theta' + 90°) = kBI \cdot \cos \theta' \quad (2)$$

The ECU 30 has a memory that stores a processing program for obtaining the angular speed of the rotation object 1. The ECU 30 calculates $\tan \theta'$ by the following expression (3) and an angle $\theta'$ (hereinafter referred to as trigonometric value or base angle), which is described with reference to FIG. 17, by the following expression (4).

$$\tan \theta' = \sin \theta' / \cos \theta' = Va/Vb \quad (3)$$

$$\theta' = \arctan(Va/Vb) \quad (4)$$

Figure 2:
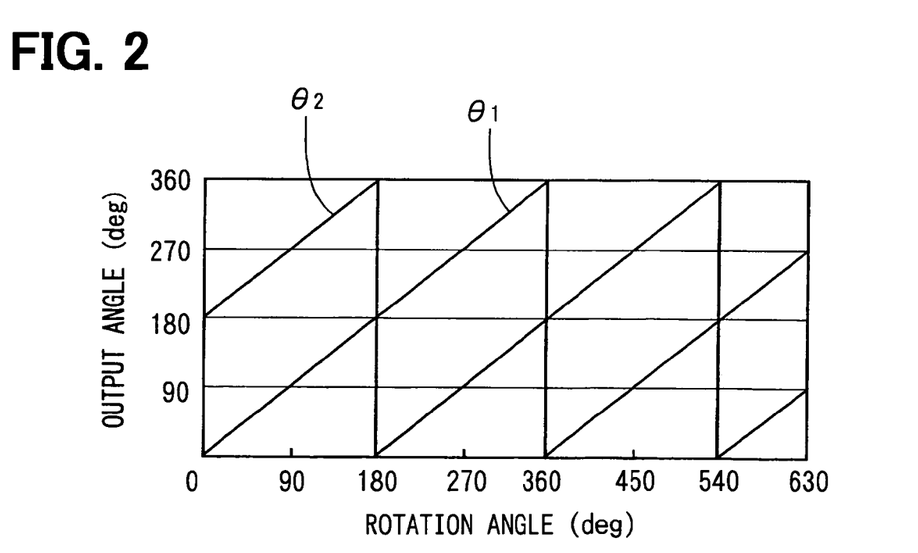
FIG. 2 is a graph showing a relationship between the rotation angle of a rotating object and the output angle of the angular speed detecting device according to the first embodiment of the invention.

The ECU 30 distinguishes an angular position of the rotating object 1 in terms of 360-degree angular range by a combination of the plus and minus sign of the voltage signals Va, Vb and the trigonometric values $\theta'$. The ECU 30 provides a pair of saw-tooth-wave curves of output angles $\theta_1$ and $\theta_2$ by adding offset angles 180 degrees or 360 degrees to the trigonometric value $\theta'$, as shown in FIGS. 2, 4 and 5, in which character N indicates that the plus or minus sign is neglected to distinguish the angular position.

Figure 4:
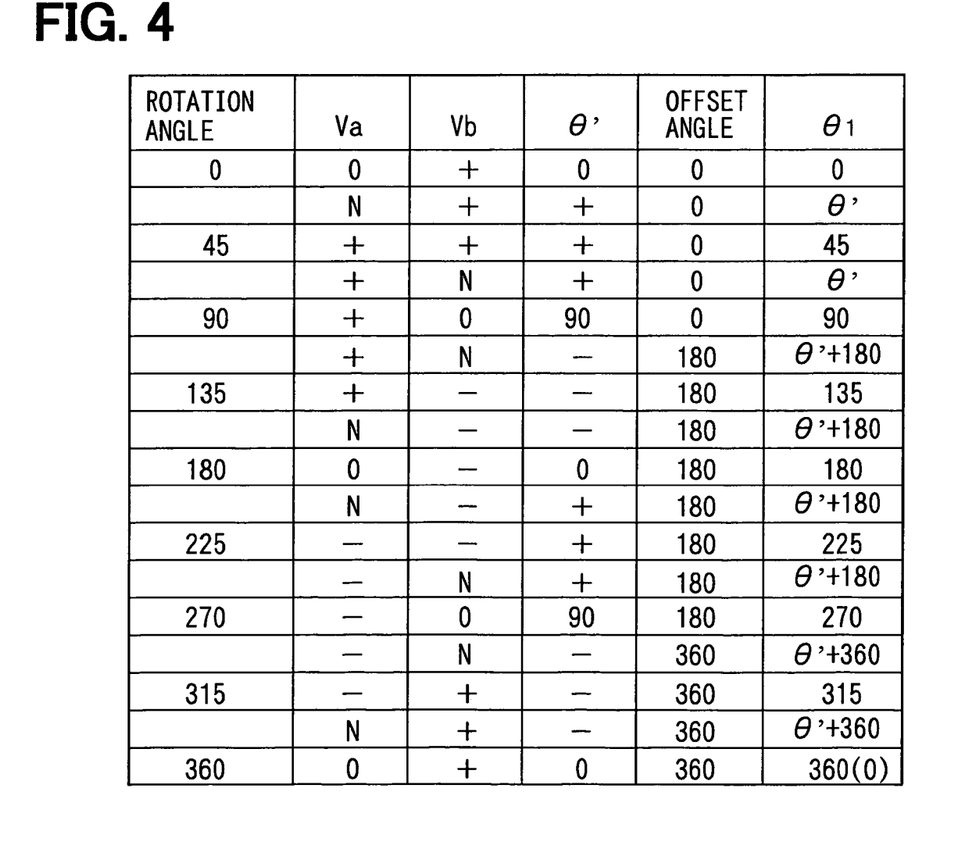
FIG. 4 is a table of the angular speed detecting device according to the first embodiment of the invention to show a relationship between rotation angle ranges, positive and negative signs of output signals of a magnetic sensor unit, trigonometric values and output angles.

The offset angle for the curve of output angles $\theta_1$ shown in FIG. 4 does not change at rotation angle 180° but changes at rotation angles 0° (360°), 90° and 270° where plus or minus sign of the trigonometric value $\theta'$ changes to one from the other. That is, the offset angle changes from 360° to 0° at rotation angle 0°, from 0° to 180° at rotation angle 90° and from 180 to 360° at rotation angle 270°.

Figure 5:
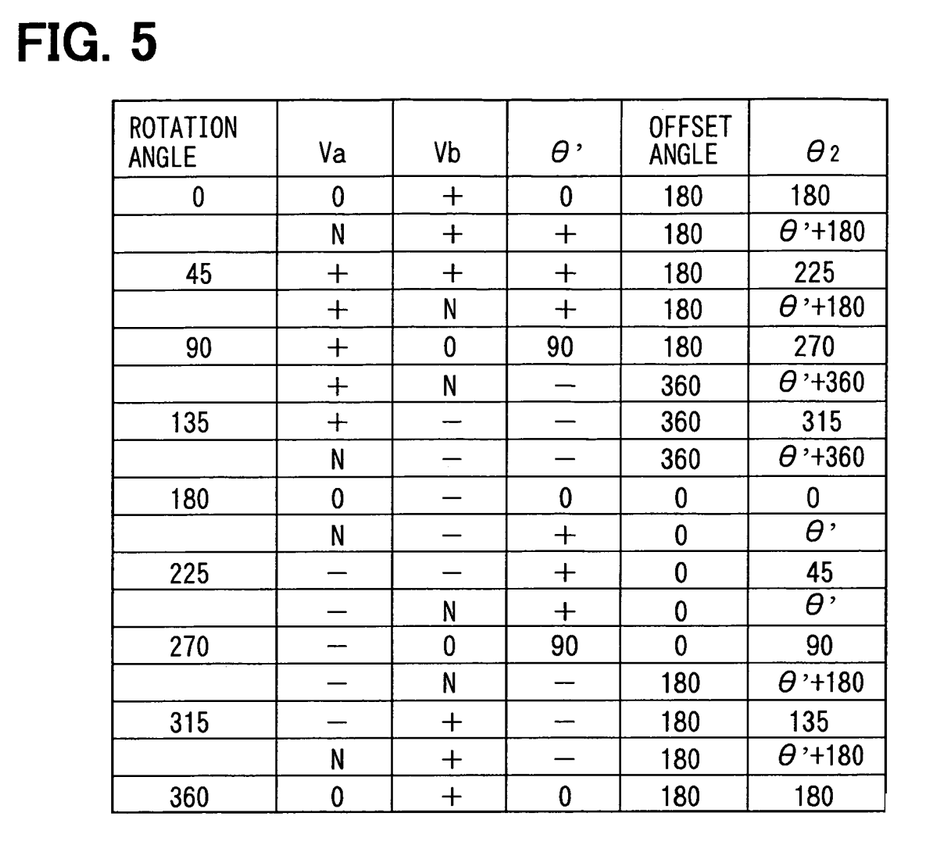
FIG. 5 is another table of the angular speed detecting device according to the first embodiment of the invention to show a relationship between rotation angle ranges, positive and negative signs of output signals of a magnetic sensor unit, trigonometric values and output angles.

On the other hand, the offset angle for the curve of output angles $\theta_2$ shown in FIG. 5 does not change at rotation angle 0° (360°) but changes at rotation angles 90°, 180° and 270° where the plus or minus sign of the trigonometric value $\theta'$ changes to one from the other. That is, the offset angles change from 360° to 0° at rotation angle 180°, change from 180° to 360° at rotation angle 90° and change from 0 to 180° at rotation angle 270°.

Incidentally, although the trigonometric value $\theta'$ at the rotation angle 90° and 270° can not be calculated because of Va/Vb with Vb=0 according to the expression (4), it can be set to 90° in order to provide the corresponding output angles, 90° and 270°.

Figure 3:
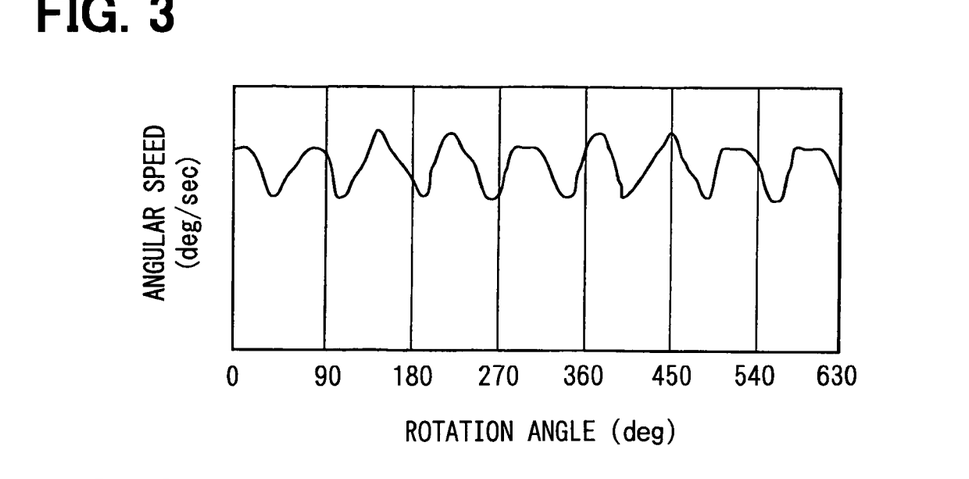
FIG. 3 is a graph showing a relationship between the rotation angle of a rotating object and the angular speed thereof.

Thus, the angular speed of a rotating object in terms of 360-degree angular range can be detected accurately or without noises, as shown in FIG. 3, if the curves of the output angles $\theta_1$ and $\theta_2$ are selectively used with the plus or minus sign of the voltage signals Va and Vb before and after the rotation angles 0°(360°) and 180° being neglected. That is, when the rotation angle of a rotating object is about 180°, the angular speed is calculated from the curve of the output angle $\theta_1$. On the other hand, the angular speed is calculated from the curve of the output angle $\theta_2$ when the rotation angle of a rotating object is about 360°.

If the pair of Hall elements 20, 22, is disposed in the space between the permanent magnets 12, 14 inclined with respect to each other at an angle α that is other than 90 degrees, the Hall element 20 generates a sinusoidal voltage signal Va and the Hall element 22 generates a sinusoidal voltage signal Vb, the two sinusoidal voltage signals Va, Vb are different in phase from each other by α and are defined by the following expressions.

$$\tan\theta' = \cot\alpha \cdot (Va-Vb)/(Va+Vb) \quad (5)$$

$$\theta' = \arctan\{\cot\alpha \cdot (Va-Vb)/(Va+Vb)\} \quad (6)$$

Therefore, the angular speed can be accurately detected in the same manner as described above.

Figure 6:
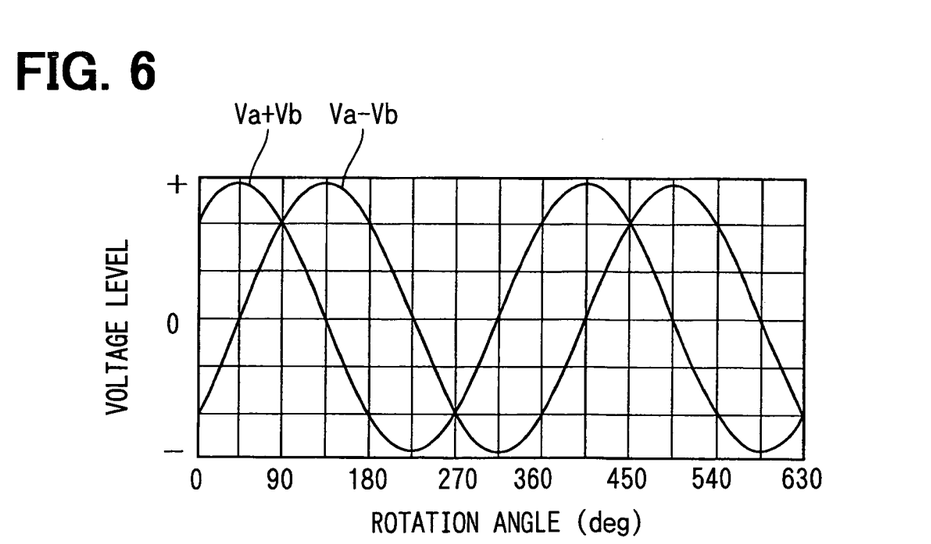
FIG. 6 is a graph showing a relationship between the rotation angle of a rotating object and the output voltage of a magnetic sensor unit of an angular speed detecting device according to the second embodiment of the invention.

An angular speed detecting device 10 according to the second embodiment of the invention will be described with reference to FIGS. 6-8. The angular speed detecting device 10 is substantially the same in construction except for the processing program for obtaining the angular speed of the rotation object 1, which is installed into the ECU 30.

Figure 7:
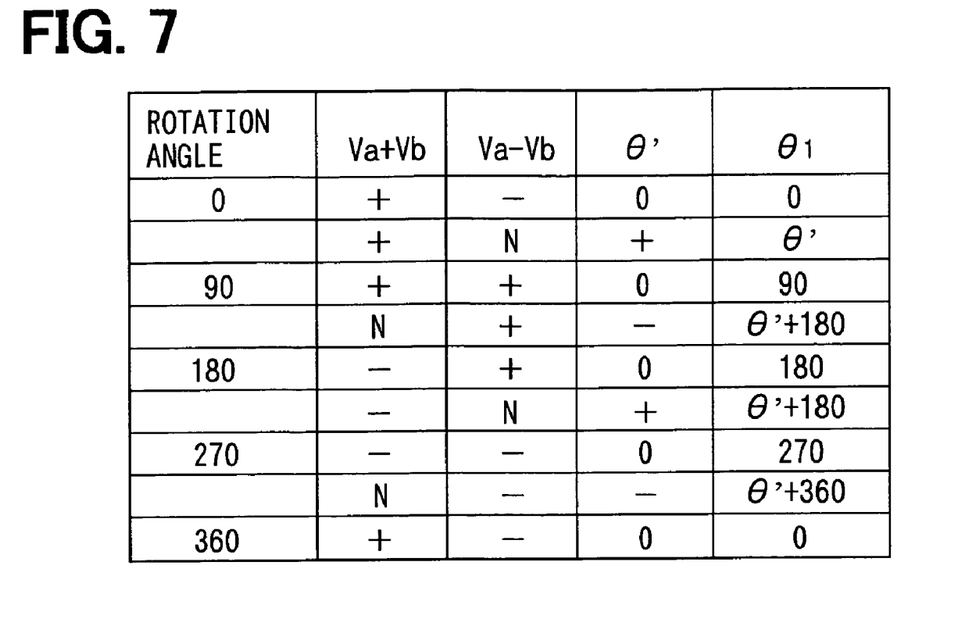
FIG. 7 is a table of the angular speed detecting device according to the second embodiment of the invention to show a relationship between the rotation angle range and combinations of the plus or minus sign of the sum and difference of output signals of a magnetic sensor unit, trigonometric values and output angles.
Figure 8:
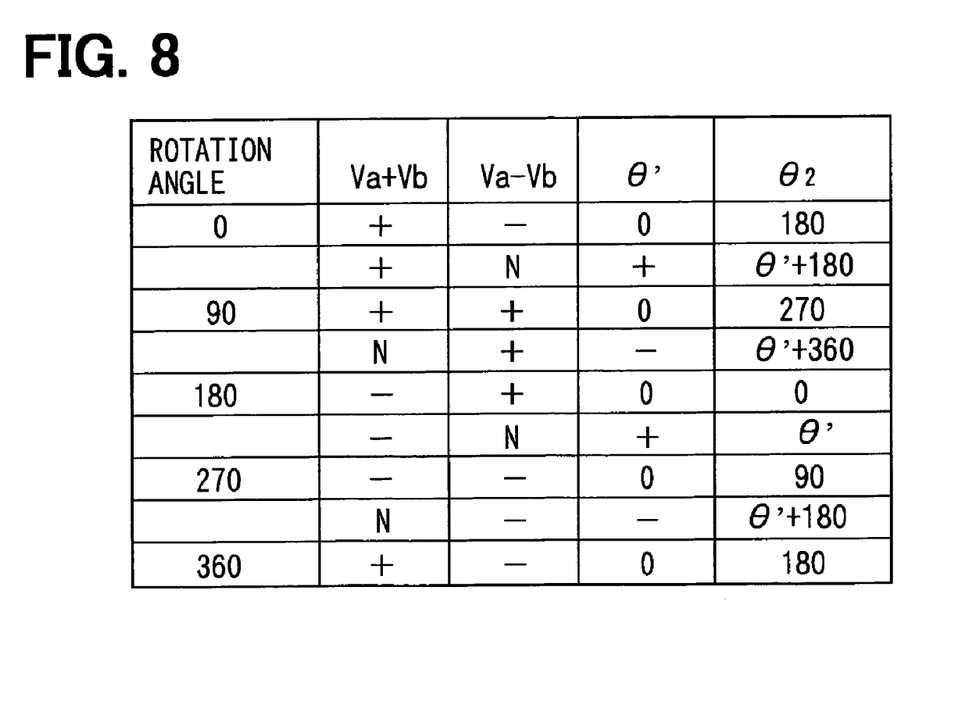
FIG. 8 is another table of the angular speed detecting device according to the second embodiment of the invention to show a relationship between the rotation angle range and combinations of the plus or minus sign of the sum and difference of output signals of a magnetic sensor unit, trigonometric values and output angles.

The ECU 30 provides a pair of saw-tooth-wave curves of output angles $\theta_1$ and $\theta_2$ by adding offset angles to the trigonometric value θ', as shown in FIGS. 7 and 8, in which character N indicates that the plus or minus sign is neglected to distinguish the angular position. In this case, plus and minus sign of the sum (i.e. Va+Vb) and difference (i.e. Va−Vb) of the voltage signals Va and Vb are used to distinguish the angular position of the rotating object instead of the plus and minus sign of each of the voltage signals Va, Vb. The sum and the difference can be expressed as follows:

$$Va+Vb = kBI\cdot\sin\theta + kBI\cdot\cos\theta = \sqrt{2}kBI\cdot\sin(\theta+45) \quad (7)$$

$$Va-Vb = kBI\cdot\sin\theta - kBI\cdot\cos\theta = \sqrt{2}kBI\cdot\sin(\theta-45) \quad (8)$$

Then, the output angles $\theta_1$ and $\theta_2$ can be determined by combining the plus or minus sign of the Va+Vb, Va−Vb and the trigonometric value θ', as shown in FIGS. 7 and 8.

Thus, the angular speed of a rotating object in terms of 360-degree angular range can be detected by selectively using curves of the output angles $\theta_1$ and $\theta_2$ while neglecting the plus or minus sign of the voltage signals in the same manner as the first embodiment.

Figure 9:
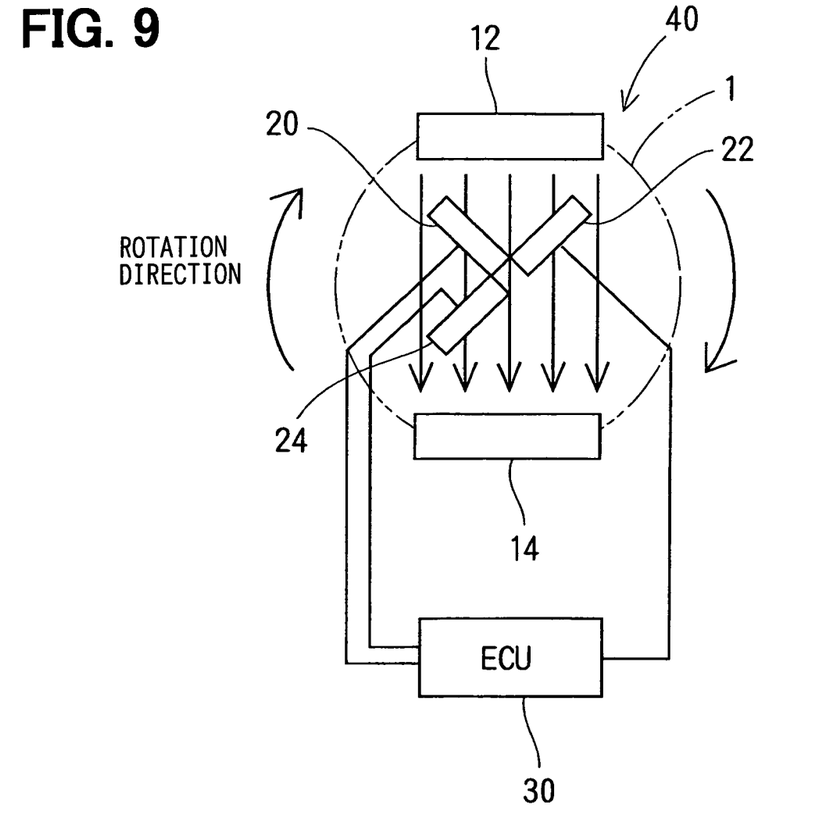
FIG. 9 is a schematic diagram illustrating an angular speed detecting device according to the third embodiment of the invention.

An angular speed detecting device 40 according to the third embodiment of the invention will be described with reference to FIG. 9.

The angular speed detecting device 40 includes a pair of permanent magnets 12 and 14, three Hall elements 20, 22 and 24 and the ECU 30.

Figure 10:
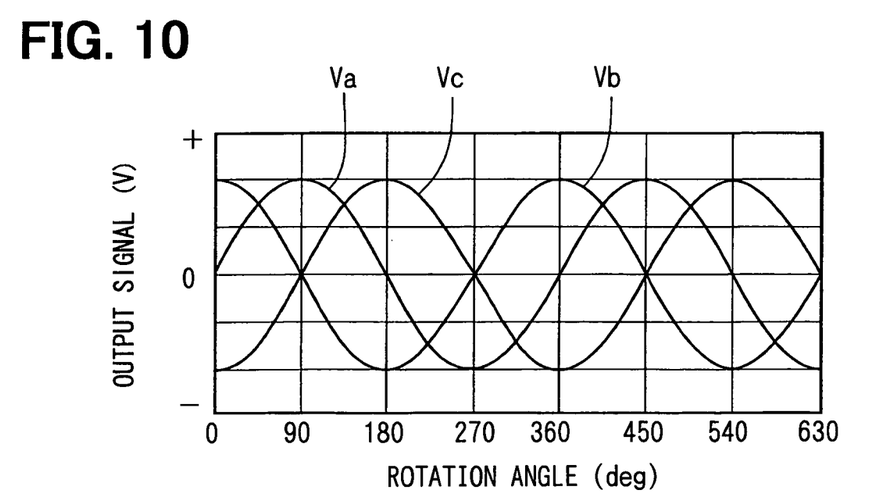
FIG. 10 is a graph showing a relationship between the rotation angle of a rotating object and the output voltages of a magnetic sensor unit of an angular speed detecting device according to the third embodiment of the invention.

The Hall elements 20, 22, 24 have the same construction and are disposed in the space between the permanent magnets 12, 14 inclined with respect to each other at an angle of 90 degrees. Therefore, when the rotating object 1 rotates and the Hall elements are electrically powered, the Hall elements 20, 22 and 24 generates sinusoidal voltage signals that are 90 degrees in angle different from another. In other words, the Hall element 20 generates a sinusoidal voltage signal Va, the Hall element 22 generates a sinusoidal voltage Vb, and the Hall element 24 generates a sinusoidal voltage signal Vc, as shown in FIG. 10.

Figure 11:
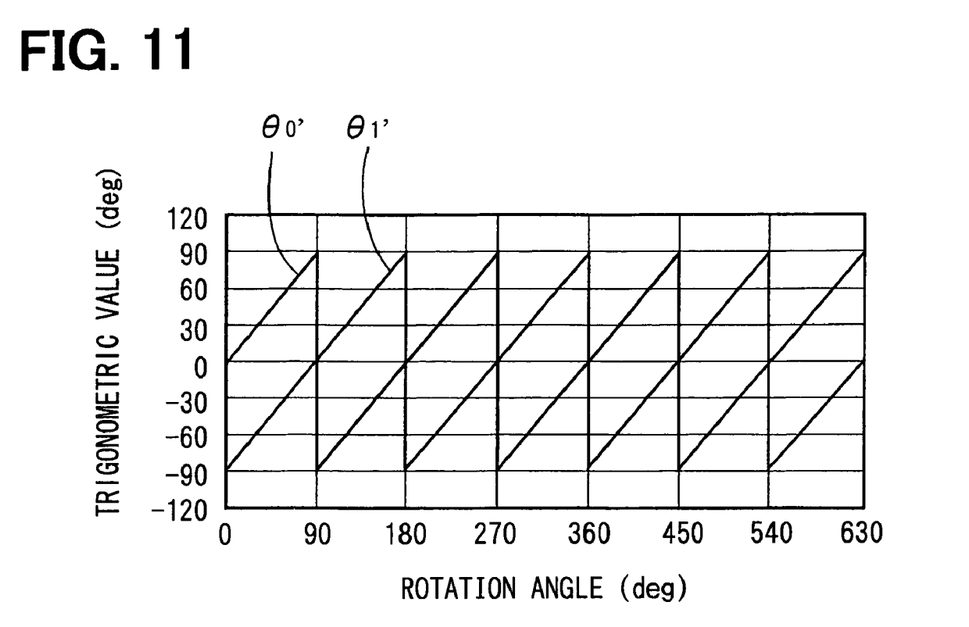
FIG. 11 is a graph showing a relationship between the rotation angle of a rotating object and trigonometric values of the angular speed detecting device according to the third embodiment of the invention.

The ECU 30 calculates, using the expression (5) and (6), a trigonometric value $\theta_0'$ from the voltage signals Va and Vb and a trigonometric value $\theta_1'$ from the voltage signals Va and Vc, forming a pair of saw-tooth curves as shown in FIG. 11.

Figure 12:
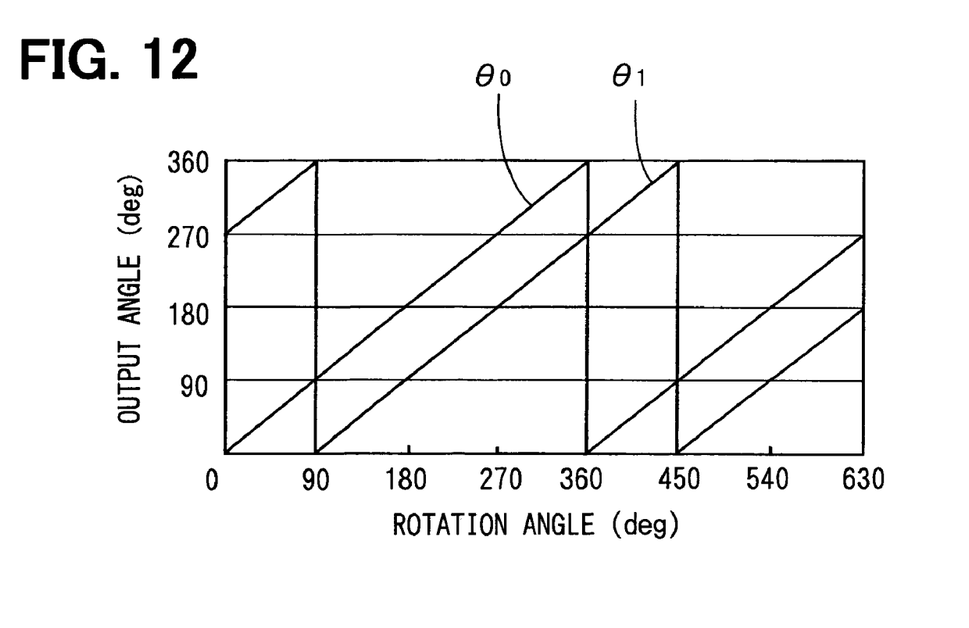
FIG. 12 is a graph showing a relationship between the rotation angle of a rotating object and output angles of the angular speed detecting device according to the third embodiment of the invention.
Figure 13:
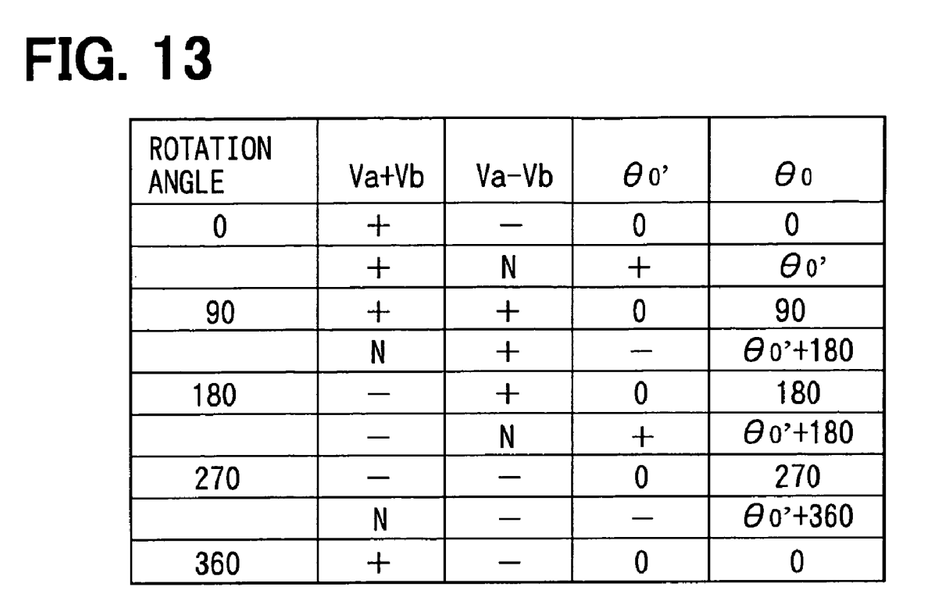
FIG. 13 is a table of the angular speed detecting device according to the third embodiment of the invention to show a relationship between the rotation angle ranges, combinations of the plus or minus sign of the sum and difference of output signals of a magnetic sensor unit, trigonometric values and output angles.
Figure 14:
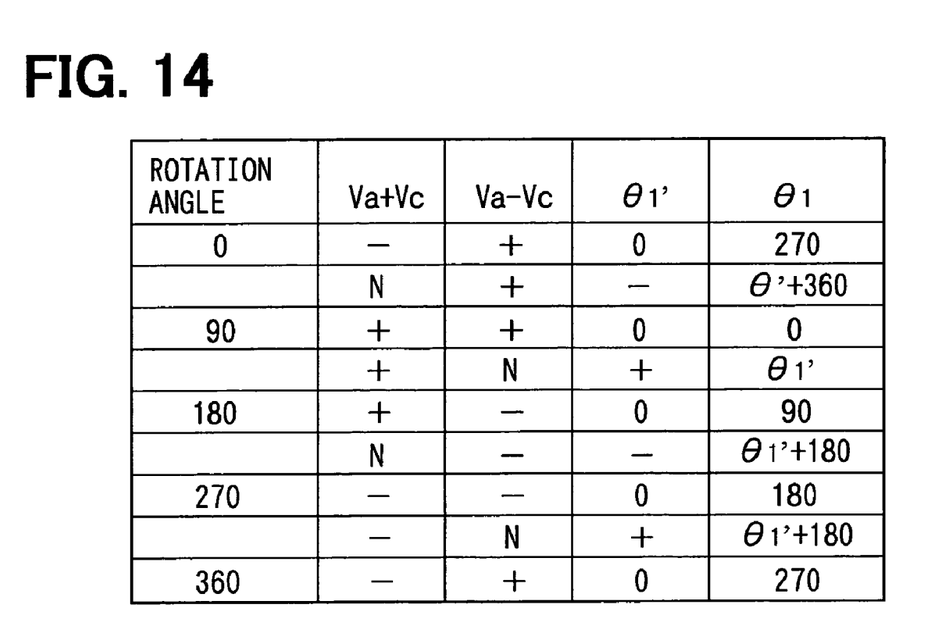
FIG. 14 is a table of the angular speed detecting device according to the third embodiment of the invention to show a relationship between the rotation angle ranges, combinations of the plus or minus sign of the sum and difference of different output signals of a magnetic sensor unit another trigonometric values and output angles.

The ECU 30 distinguishes angular positions of the rotating object 1 in terms of 360-degree angular range by combinations of the plus and minus sign of the voltage signals (Va+Vb), (Va−Vb) and the trigonometric values $\theta_0'$, $\theta_1'$ as shown in FIGS. 13 and 14, thereby to provide a pair of saw-tooth-wave curves of output angles $\theta_0$ and $\theta_1$ by adding offset angles to the trigonometric values $\theta_0'$, $\theta_1'$, as shown in FIG. 12.

Thus, the angular speed of a rotating object in terms of 360-degree angular range can be obtained by selectively using curves of the output angles $\theta_0'$ and $\theta_1'$ while neglecting the plus or minus sign of the voltage signals Va and Vb before and after the rotation angles 90° and 270'.

If the Hall elements are disposed included with respect to each other at an angle α that is other than 90 degrees, the two sinusoidal voltage signals Va, Vb are different in phase from each other by α and are defined by the expressions (5) and (6). Therefore, the angular speed can be accurately detected in the same manner as described.

Figure 15:
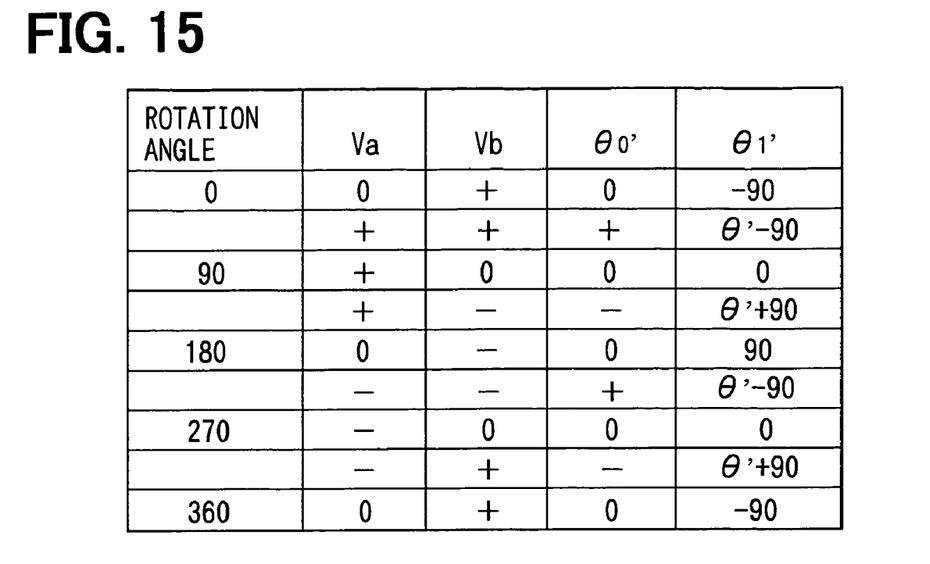
FIG. 15 is a table of the angular speed detecting device according to the fourth embodiment of the invention to show a relationship between rotation angle ranges, combinations of positive and negative signs of output signals of the magnetic sensor unit, trigonometric values and output angles.

An angular speed detecting device according to the fourth embodiment of the invention will be described with reference to FIGS. 1, 15 and 16.

Figure 1:
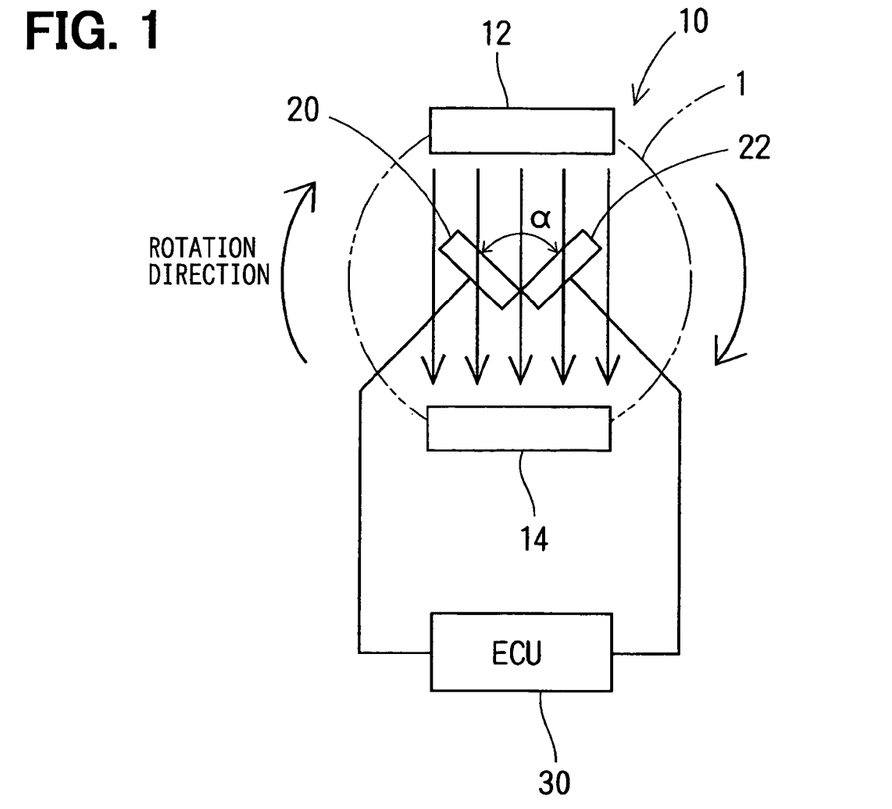
FIG. 1 is a schematic diagram illustrating an angular speed detecting device according to the first embodiment of the invention.

The angular speed detecting device includes a pair of Hall elements 20 and 22 as shown in FIG. 1.

The ECU 30 calculates, using a processing program and the expressions (3) and (4), trigonometric value $\theta_0'$ shown in FIG. 11 from the voltage signals Va and Vc, shown in FIG. 16.

The ECU 30 distinguishes an angular position of the rotating object 1 in terms of 360-degree angular range by a combination of the plus and minus sign of the voltage signals Va, Vb and the trigonometric values $\theta_0'$. The ECU 30 provides a saw-tooth-wave curve of another trigonometric value $\theta_1'$ by adding an offset angle of 90 degrees to the trigonometric value $\theta_0'$, which are used as the output angles. Thus, the angular speed of a rotating object in terms of 360-degree angular range can be detected by selectively using the curves of the trigonometric values $\theta_0'$ and $\theta_1'$ in substantially the same manner as the above embodiments.

The Hall elements used in the above embodiments can be replaced by magnetic resistance (reluctance) elements.

The trigonometric values $\theta_0'$, $\theta_1'$ of the angular speed detecting device according to the third embodiment can be used as the output angles in the same manner as the fourth embodiment.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An angular speed detecting device for detecting an angular speed of a rotating object, said device comprising:
    first means for setting a magnetic field;
    second means for generating a first sinusoidal signal Va and a second sinusoidal signal Vb that each change between plus and minus signs as a function of change in relative direction of the magnetic field between the first and second means as an object rotates and causes relative rotational motion between the first and second means; and
    computing apparatus configured for calculating an angular speed from the first and second signals by (a) forming a pair of trigonometric functions of a trigonometric value θ' from the sinusoidal signals Va and Vb, (b) forming a table showing plus or minus signs for the pair of sinusoidal signals Va, Vb and for corresponding trigonometric values θ' at a plurality of rotational angles of the rotating object, (c) distinguishing rotational position of the rotating object based on combinations of the plus or minus signs for the first and second sinusoidal signals Va, Vb and the trigonometric value θ', (d) forming a pair of saw-tooth curves of output angles $\theta_1$, $\theta_2$ in terms of a 360-degree angular range that are different in phase with respect to each other by adding offset values to the trigonometric value θ' according to the rotation position that is distinguished above, and (e) selectively using curves of the output angles $θ_1$ and $θ_2$ to calculate the angular speed of the rotating object, thereby reducing noise.

2. An angular speed detecting device as in claim 1, wherein:
said computer apparatus forms one of the pair of trigonometric functions from a sum of the sinusoidal signals Va and Vb and forms the other of the pair of trigonometric functions from a difference between the sinusoidal signals Va and Vb.

3. An angular speed detecting device as in claim 1, wherein:
said computer apparatus does not use the plus or minus sign of one of the voltage signals Va and Vb at a position where the sign of one of the voltage signals changes when distinguishing the rotational position of the rotating object based on combinations of the plus or minus sign of the first and second sinusoidal signals Va, Vb and the trigonometric values θ'.

4. An angular speed detecting device as in claim 1, wherein said second means comprises a pair of Hall elements.

5. An angular speed detecting device as in claim 4, wherein said Hall elements are disposed in the magnetic field inclined with respect to each other at an angle of 90 degrees.

6. An angular speed detecting device as in claim 1, wherein said second means comprises a pair of magnetic resistance elements.

7. An angular speed detecting device for detecting an angular speed of a rotating object, said device comprising:
first means for setting a magnetic field;
second means for generating sinusoidal signals Va, Vb, Vc that respectively change as a function of change in relative direction of the magnetic field with respect to the second means caused by rotational changes of said object; and
computing apparatus configured for calculating an angular speed from the sinusoidal signals by (a) forming three trigonometric functions of a trigonometric value θ' from the sinusoidal signals Va, Vb, Vc, (b) forming a pair of saw-tooth curves of trigonometric values $θ'_0$ and $θ'_1$ from the three trigonometric functions, (c) forming a pair of tables showing plus or minus signs for a sum and a difference of a trigonometric two of the three trigonometric functions and for the trigonometric values $θ'_0$ and $θ'_1$ at a plurality of rotational angles of the rotating object, (d) distinguishing rotational position of the rotating object based on combinations of the plus or minus sign of the trigonometric functions and the trigonometric values $θ'_0$ and $θ'_1$, (e) forming a pair of saw-tooth curves of output angles $θ'_0$ and $θ'_1$ in terms of a 360-degree angular range that are different in phase with respect to each other by respectively adding offset values to the trigonometric values $θ'_0$ and $θ'_1$ according to the rotational position that is distinguished and selectively using curves of the output angles $θ'_0$ and $θ'_1$ to calculate angular speed of the rotating object, thereby reducing noise.

8. An angular speed detecting device as in claim 7, wherein said second means comprises three Hall elements.

9. An angular speed detecting device as in claim 8, said Hall elements being disposed in the magnetic field inclined with respect to each other at an angle of 90 degrees.

10. An angular speed detecting device for detecting an angular speed of a rotating object, said device comprising:
a magnetic sensor unit, said unit including a permanent magnet that forms a magnetic field and at least a pair of magnetic sensor elements disposed in the magnetic field to generate a pair of signals that change as magnetic field direction changes relative to the sensors as an object rotates; and
an electric computing unit that calculates an angular speed from the signals by (a) forming sine and cosine functions of an angle θ' from the signals, (b) forming a saw-tooth curve of the angle θ' from the sine and cosine functions, (c) forming a table showing plus or minus signs for the signals and the saw-tooth curve of the angle θ' at a plurality of rotational angles of the rotating object, (d) forming a pair of curves of output angles $θ'_0$ and $θ'_1$ over a 360-degree angular range that are different in phase from each other by distinguishing rotational position of the rotating object based on a combination of the plus or minus signs for the signals and the saw-tooth curve of the angle θ', and (e) selectively using curves of the output angles $θ'_1$ and $θ'_2$ to calculate angular speed of the rotating object, thereby reducing noise.

11. An angular speed detecting device for detecting an angular speed of a rotating object, said device comprising:
a magnetic sensor unit, said unit including a permanent magnet that forms a magnetic field and at least a pair of magnetic sensor elements disposed in the magnetic field to generate a pair of sinusoidal signals that change as magnetic field direction changes relative to the sensors as an object rotates; and
an electric computing unit that calculates an angular speed from the sinusoidal signals by (a) forming sine and cosine functions of an angle θ' from the sinusoidal signals, (b) forming a saw-tooth curve of the angle θ' from the sine and cosine functions, (c) forming a table showing whether each of the sine function, cosine function and the saw-tooth curve of the angle θ' is positive or negative at a plurality of rotational angles of the rotating object, (d) forming a pair of curves of output angles $θ'_1$ and $θ'_2$ over a 360-degree angular range that are different in phase relative to each other by distinguishing rotational position of the rotating object based on combinations of positive and negative signs of the signals and the saw-tooth curve of the angle θ', and (e) selectively using curves of the output angles $θ'_1$ and $θ'_2$ to calculate angular speed of the rotating object, thereby reducing noise.

12. An angular speed detecting device as in claim 11 wherein said magnetic sensor unit comprises a pair of Hall elements.

13. An angular speed detecting device as in claim 12 wherein said Hall elements are disposed in the magnetic field inclined with respect to each other at an angle of 90 degrees.

14. A method for detecting angular speed of a rotating object, said method comprising:
setting a magnetic field;
generating a first sinusoidal signal Va and a second sinusoidal signal Vb that each change between plus and minus signs as a function of change in relative direction of the magnetic field between two structures as an object rotates and causes relative rotational motion between the two structures;
calculating an angular speed from the first and second signals by (a) forming a pair of trigonometric functions of a trigonometric value θ' from the sinusoidal signals Va and Vb, (b) forming a table showing plus or minus signs for the pair of sinusoidal signals Va, Vb and for corresponding trigonometric values θ' at a plurality of rotational angles of the rotating object, (c) distinguishing rotational position of the rotating object based on combinations of the plus or minus signs for the first and second sinusoidal signals Va, Vb and the trigonometric value θ', (d) forming a pair of saw-tooth curves of output angles θ'$_1$ and θ'$_2$ in terms of a 360-degree angular range that are different in phase with respect to each other by adding offset values to the trigonometric value θ' according to the rotation position that is distinguished above, and (e) selectively using curves of the output angles θ'$_1$ and θ'$_2$ to calculate the angular speed of the rotating object, thereby reducing noise; and outputting data representing angular speed.

15. The method as in claim 14 wherein:

one of the pair of trigonometric functions is formed from a sum of the sinusoidal signals Va and Vb and forms the other of the pair of trigonometric functions from a difference between the sinusoidal signals Va and Vb.

16. The method as in claim 14 wherein:

the plus or minus sign of one of the voltage signals Va and Vb is not used at a position where the sign of one of the voltage signals changes when distinguishing the rotational position of the rotating object based on combinations of the plus or minus sign of the first and second sinusoidal signals Va, Vb and the trigonometric values θ'.

17. The method as in claim 14 wherein one of the structures comprises a pair of Hall elements.

18. The method as in claim 17 wherein said Hall elements are disposed in the magnetic field inclined with respect to each other at an angle of 90 degrees.

19. The method as in claim 14 wherein one of said structures comprises a pair of magnetic resistance elements.

20. A method for detecting an angular speed of a rotating object, said method comprising:

setting a magnetic field;

generating sinusoidal signals Va, Vb, Vc that respectively change as a function of change in relative direction of the magnetic field caused by rotational changes of said object;

calculating an angular speed from the sinusoidal signals by (a) forming three trigonometric functions of a trigonometric value θ' from the sinusoidal signals Va, Vb, Vc, (b) forming a pair of saw-tooth curves of trigonometric values θ'$_0$ and θ'$_1$ from the three trigonometric functions, (c) forming a pair of tables showing plus or minus signals for a sum and a difference of respective two of the three trigonometric functions and for the trigonometric θ'$_0$ and θ'$_1$ at a plurality of rotational angles of the rotating object, (d) distinguishing rotational position of the rotating object based on combinations of the plus or minus sign of the trigonometric functions and the trigonometric values θ'$_0$ and θ'$_1$, (e) forming a pair of saw-tooth curves of output angles θ'$_0$ and θ'$_1$ in terms of a 360-degree angular range that are different in phase with respect to each other by respectively adding offset values to the trigonometric values θ'$_0$ and θ'$_1$ according to the rotational position that is distinguished and selectively using curves of the output angles θ'$_0$ and θ'$_1$ to calculate angular speed of the rotating object, thereby reducing noise; and outputting data representing said angular speed.

21. A method for detecting an angular speed of a rotating object, said method comprising:

providing a magnetic sensor unit, said unit including a permanent magnet that forms a magnetic field and at least a pair of magnetic sensor elements disposed in the magnetic field to generate a pair of signals that change as magnetic field direction changes relative to the sensors as an object rotates;

calculating an angular-speed from the signals by (a) forming sine and cosine functions of an angle θ' from the signals, (b) forming a saw-tooth curve of the angle θ' from the sine and cosine functions, (c) forming a table showing plus or minus signs for the signals and the saw-tooth curve of the angle θ' at a plurality of rotational angles of the rotating object, (d) forming a pair of curves of output angles θ'$_0$ and θ'$_1$ over a 360-degree angular range that are different in phase from each other by distinguishing rotational position of the rotating object based on a combination of the plus or minus signs for the signals and the saw-tooth curve of the angle θ', and (e) selectively using curves of the output angles θ'$_0$ and θ'$_1$ to calculate angular speed of the rotating object thereby reducing noise; and outputting data representing said angular speed.

22. A method for detecting an angular speed of a rotating object, said method comprising:

providing a magnetic sensor unit including a permanent magnet that forms a magnetic field and at least a pair of magnetic sensor elements disposed in the magnetic field and generating a pair of sinusoidal signals that change as magnetic field direction changes relative to the sensors as an object rotates;

calculating an angular speed from the sinusoidal signals by (a) forming sine and cosine functions of an angle θ' from the sinusoidal signals, (b) forming a saw-tooth curve of the angle θ' from the sine and cosine functions, (c) forming a table showing whether each of the sine function, cosine function and the saw-tooth curve of the angle θ' is positive or negative at a plurality of rotating angles of the rotating object, (d) forming a pair of curves of output angles θ'$_0$ and θ'$_1$ over a 360-degree angular range that are different in phase relative to each other by distinguishing rotational position of the rotating object based on combinations of positive and negative signs of the signals and the saw-tooth curve of the angle θ', and (e) selectively using curves of the output angles θ'$_0$ and θ'$_1$ to calculate angular speed of the rotating object, thereby reducing noise; and outputting data representing said angular speed.

23. The method of claim 20 wherein said generating step comprises use of three Hall elements.

24. The method of claim 23, said Hall elements being disposed in the magnetic field inclined with respect to each other at an angle of 90 degrees.

25. The method of claim 22 wherein said magnetic sensor unit comprises a pair of Hall elements.

26. The method of claim 25 wherein said Hall elements are disposed in the magnetic field inclined with respect to each other at an angle of 90 degrees.

* * * * *